United States Patent
Montagner

(10) Patent No.: US 7,281,299 B2
(45) Date of Patent: Oct. 16, 2007

(54) PARTICULARLY REDUCED ELASTIC HINGE FOR THE ELASTICATION OF A SIDE ARM FOR GLASSES, STRUCTURED FOR THE REDUCTION OF CLEARANCE AND WITH A HIGHLY SLIDEABLE CARRIAGE

(75) Inventor: Luciano Montagner, Sant'Anna (IT)

(73) Assignee: Ideal s.r.L., Quero (BL) (IT)

( * ) Notice: Subject to any disclaimer, the term of this patent is extended or adjusted under 35 U.S.C. 154(b) by 184 days.

(21) Appl. No.: 11/135,880

(22) Filed: May 25, 2005

(65) Prior Publication Data

US 2006/0017881 A1 Jan. 26, 2006

(30) Foreign Application Priority Data

Jun. 16, 2004 (IT) ................ TV20040029 U

(51) Int. Cl.
G02C 5/22 (2006.01)

(52) U.S. Cl. .......................... 16/228; 351/153

(58) Field of Classification Search .................. 16/228, 16/281, 286, 277, 50, 296, DIG. 13; 351/113, 351/119, 121, 153, 63, 140
See application file for complete search history.

(56) References Cited

U.S. PATENT DOCUMENTS

| | | | | |
|---|---|---|---|---|
| 4,747,183 A | * | 5/1988 | Drlik | 16/228 |
| 5,533,233 A | * | 7/1996 | Wagner et al. | 16/228 |
| 5,745,209 A | | 4/1998 | Khantzis | |
| 5,751,393 A | * | 5/1998 | Yamazaki | 351/63 |
| 5,755,010 A | * | 5/1998 | Lehnert | 16/228 |
| 6,095,646 A | * | 8/2000 | Montagner | 351/153 |
| 6,161,254 A | * | 12/2000 | Montagner | 16/228 |
| 6,952,859 B2 | * | 10/2005 | Wagner | 16/228 |
| 6,996,876 B2 | * | 2/2006 | Montagner | 16/228 |
| 2005/0086768 A1 | * | 4/2005 | Chang | 16/228 |

FOREIGN PATENT DOCUMENTS

| DE | 0166822 | | 1/1986 |
|---|---|---|---|
| FR | 628846 A1 | * | 12/1994 |
| IT | 1288611 | | 10/1997 |

* cited by examiner

Primary Examiner—Robert J. Sandy
(74) Attorney, Agent, or Firm—Egbert Law Offices

(57) ABSTRACT

Side arm for glasses structured for the reduction of clearance and with a highly slideable carriage, essentially including a small box, associated to the side arm by welding and preassembly. Two springs are housed on the inside the springs on one side having the end in abutment on the bottom of the small box and on the other side being arranged in abutment of the end of a tie-rod/carriage, with respect to which one is arranged adjacently per side. A tie-rod/carriage is substantially T-shaped presenting the anterior end, provided with a convenient articulation hinged to a corresponding nose provided on the frame of the glasses and in which at least one clearance compensation element is interposed between the bottom of the internal seat of the small box and the profile of the portion of tie-rod/carriage facing the bottom of the internal seat of the small box.

4 Claims, 1 Drawing Sheet

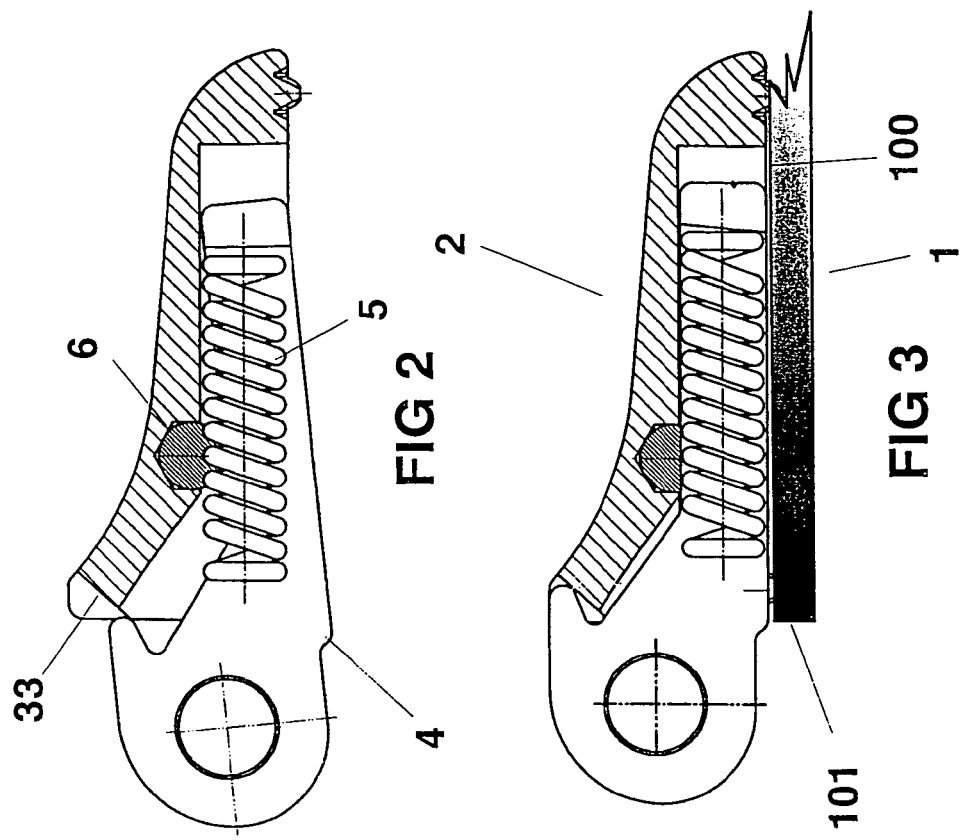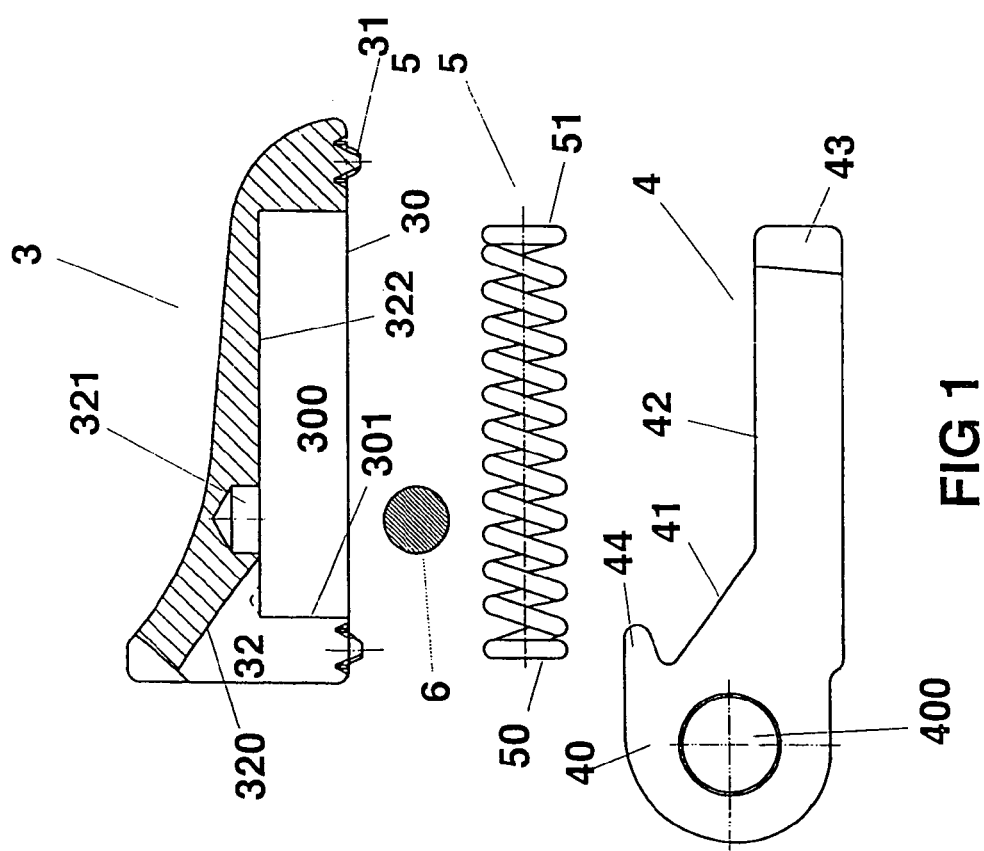

PARTICULARLY REDUCED ELASTIC HINGE FOR THE ELASTICATION OF A SIDE ARM FOR GLASSES, STRUCTURED FOR THE REDUCTION OF CLEARANCE AND WITH A HIGHLY SLIDEABLE CARRIAGE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention refers to a particularly reduced elastic hinge, for the elastication of a side arm for glasses, structured for the reduction of clearance and with highly slideable carriage.

The invention finds particular although not exclusive application in the field of components to facilitate the use of the glasses.

BACKGROUND OF THE INVENTION

Glasses frames are certainly well known. For example, some provide devices, made in proximity to the hinging of the side arm to the front, to allow the elasticized engagement to that part pertaining to said nose. This function, obtained on both sides of the front, on one hand has the advantage of providing improved wearability, since the side arms press less in correspondence to the temples therefore proving more tolerable for the vast general public, on the other hand it has the value of providing greater adaptability to the different morphologies of the face. Therefore, the companies of the sector have been oriented in this direction for some time, with the main aim of finding innovative solutions and often improvements, both for that which concerns the working of the flex device and above all dimensions.

PRIOR ART

A traditional elasticized side arm, that is popular with the consumer public, for example, is made up of the patent for Utility Model IT181221, having as an aim an improved hinge for the articulation of a glasses frame with a side arm that can be divaricated elastically, in which a square support embedded in the frame is provided, on which a support that is also squared constituting a shoulder for the compression of a spring is hinged.

IT1147198 also has as an object a side-piece with elastic hinging, in which the end of the side-piece comprises a small block that is axially holed and between which one connection end of the hinge is inserted. Continuing with a reduced diameter, supporting linearly a ridged plate that inserts into the hole while rearward to this a blocked tension helicoidal spring is provided at the end of the element with a threaded ring-nut. In this case, the elastic opening of the side-piece is permitted according to a determined angle by means of the elasticity of the hinge attachment.

In the sector, that is rather crowded with flex devices, other mechanism typologies are also to be found, which differ substantially with respect to concept from the previous solutions although they achieve the same function. Particular reference is made to those called ball type. For example, in IT1137027, the writer describes a connecting element, particularly for elastic hinges applicable to glasses frames in plastic material, which comprises a forked body, visibly housed along its entire length in a groove, defined at the end of a side arm and capable of acting as a housing seat for elastic contrast means, acting on a cam element provided integrally on the front part of a frame. The forked body defines, at one of its ends, a forked element that is connectable for hinging to said cam element, and at the other end, a fixed seat that is connectable astride a metallic core, inserted in the side arm. In IT1153126, a process for producing side arms is described, which consists of cutting a bar, with a metallic section, to the length of a side arm and producing an axial hole in correspondence to one end of this rod, involving a first portion of the aforementioned bar, wherein the spring and the spheroid forming the elastic knot are housed and consists of tapering the aforementioned bar in its intermediate portion and rendering substantially filiform the terminal end of the latter.

Also EP0889347 (Bolzonello) proposes to provide a rod associated to a first body presenting an axial seat for a spring and a sphere and at this end a protrusive cam is hinged from a second body associable to a front, that is characterized in that said first body presents, at said end, an interacting inclined perimetrical surface in abutment in the extra opening stage with said second body.

The solutions illustrated previously are particularly cumbersome with respect to the elasticizing device, a circumstance that on one hand produces defects and on the other hand undoubtedly suffers from a certain limitation, as the shape of the side arm conditions the application. Other negative aspects, commonly noticeable in the solutions just described, refer to the fact that it is not possible to associate the device that is already finished directly to the bar, which involves rather long assembly times. Finally, traditional side arms have a tie-rod which, due to its shape, allows excessive clearance that favors twisting that is not appreciated by the consumer.

PRIOR ART CLOSEST TO THE INVENTION

U.S. Pat. No. 5,745,209 (Khantzis) proposes an elastic yielding device, for a side arm, consisting of two spring pistons to connect the side arms to the front of glasses frame. Said pistons are symmetrical and parallel and engage with an anterior and posterior structure of the hinge. Each cylinder of the piston contains a spring on the interior.

DE0166822 (Drlik) describes an elastic yielding device for a side arm that can be hinged to the front of a glasses frame. This device, in correspondence to the end portion of the side arm, consists of a small box with rectilinear housing obtained longitudinally and opened in correspondence to the hinging articulation side. On the interior of said housing a spiral spring is received, coaxially to which a tie-rod passes through longitudinally. In this case, said tie-rod engages a ring on the posterior side against which one end of the spring is arranged peripherally in abutment, while the opposite end of the same spring pushes against retainer integral to the small box. In this case the tie-rod passes through said retainer, in such a way as to project from one side with the cam articulation portion to be hinged to the front, while the opposite end slides with respect to the retainer. With regard to the locking of said retainer, it is observed that it is obtained by means of a sphere, which is partially received on the interior of a seat obtained along the internal surface of the small box, in such a way to be inserted into the interior of a seat obtained annularly to said retainer.

Finally, the solution described in IT1288611 (Montagner) is known. In this case, this concerns a device, particularly reduced, for the elasticizing of a side arm for glasses that essentially included a small box, associated to the side arm by means of welding and pre-assembly, on the interior of which two springs are housed, said springs on one side having the end in abutment on the bottom of the small box, and on the other being arranged in abutment to the end of a tie-rod, with respect to the which one is arranged per side; and in which the tie-rod is substantially T-shaped presenting the opposite end and provided with a convenient hole that can be hinged to a corresponding nose provided on the frame of the glasses.

Drawbacks

As a rule, the solutions mentioned are effective, however they are not free from certain defects that in a certain way condition correct working. More particularly, reference is made to the fact that with respect to the latter, residual clearance is still noted. This is the case, for example, with the solution described in IT1288611 (Montagner), which underlines in certain conditions the problem of the perception of some clearances that can influence correct working. Sometimes, moreover it is possible to observe the excessive wearing of the components. Said phenomenon, as well as the movement of dirt microparticles inside the small box, in time can lead to a slight loss of the capacity of the side arm to flex smoothly, in other words if the side arm itself is to be strained, slight hardening can occur that in a certain way compromises the correct functioning of the device.

With regard to solution DE0166822 (Drlik), the problem of excessive dimensioning remains, which on the other hand is one of the main drawbacks that IT1288611 (Montagner) intended to solve.

U.S. Pat. No. 5,745,209 (Khantzis) is also not free from drawbacks. This is due to the fact that it has a flex device that is almost divided with respect to the monolinear solutions, it succeeds in securely containing the dimensions, in any case, more so than in the proposal DE0166822 (Drlik), however it does not seem to confer that particular smoothness and progression that is instead noticeable and characteristic of IT1288611 (Montagner). To this can be added the fact that the competition of the two adjacent elastic devices certainly has the deficiency of significantly contributing to the unusual complexity of the mechanism, making assembly difficult and in conclusion seriously affecting the production costs.

From all this the companies of the sector need to find improved solutions that are more convenient and effective with respect to previous solutions.

BRIEF SUMMARY OF THE INVENTION

The aim of this invention is also to avoid the aforementioned drawbacks.

This and other aims are achieved with this invention according to the characteristics as in the included claims, solving the problems disclosed by means of a side arm for glasses structured for the reduction of clearance and with a highly slideable carriage, essentially including a small box, associated to the side arm by means of welding and pre-assembly, on the inside of which two springs are housed, said springs on one side having the end in abutment on the bottom of the small box and on the other side being arranged in abutment of the end of a tie-rod/carriage, with respect to which one is arranged adjacently per side; wherein the tie-rod/carriage is substantially T-shaped presenting the anterior end, provided with a convenient articulation that can be hinged to a corresponding nose provided on the frame of the glasses and in which at least one clearance compensation element is interposed between the bottom of the internal seat of the small box and the profile of the portion of tie-rod/carriage facing said bottom of the internal seat of the small box.

Aims

In this way, different aims and advantages are achieved through the important creative contribution, whose effect constitutes immediate technical progress.

On the whole, it is reasonable to affirm that one aim intends to obtain a flex device that in addition to giving significantly contained dimensions, with particular attention being paid to the length, confers a particular smoothness and more sensitive progression of the force in the exercise of the elastic function of the side arm hinged to the front of the frame, above all with respect to the adequate capacity to eliminate remaining clearance against the carriage.

A second objective consists in the search for a device with a contained use of components that can guarantee the exercise in good condition of the elastic function for a long period of time. To this can be added the fact that the presence of the compensator element on the interior of the small box serves to amortize and reduce possible clearances, even if it is usually only perceptible to a small degree, thus further stabilizing the assembly and therefore on the whole the glasses frame itself.

A third objective was to contain the production costs of the flex device, above all with reference to the solution suggested in IT1288611 (Montagner), notwithstanding the improved fluidity of the carriage already achieved.

It is unlike the solution DE0166822 (Drlik). The shape of the tie-rod in DE0166822 (Drlik) is suitable for supporting one single spring that is concentric to the rectilinear portion of the rod of the tie-rod itself. To this it can be added that the sphere, present on the interior of the small box does not press directly on the tie-rod, as is the case with the compensator element in the present invention, but rather is positioned in support against a retainer ring that is peripheral to the rectilinear portion of the rod of the tie-rod itself. Said retainer ring, consequently, appears substantially static, while it is only the tie-rod that in a dynamic condition is coaxially movable with respect to said tie-rod.

In conclusion, it will have a reasonable functionality-price ratio, rendering possible the use of the elastic yielding device with respect to a large number of glasses, consequently widening the base of possible users.

These and other advantages will appear from the detailed following description of a preferred solution with the aid of the included drawings.

BRIEF DESCRIPTION OF THE SEVERAL VIEWS OF THE DRAWINGS

FIG. 1 represents an exploded side elevation view of the components, according to a longitudinal cross-section, that form the elastic hinge that is associated to a corresponding side arm.

FIG. 2 represents a global elevation view of the elastic hinge taken respectively prior to fixing by means of welding.

Finally, FIG. 3 is another global elevation view of the elastic hinge as in previous Figures, in the condition set to the bar.

DETAILED DESCRIPTION OF THE INVENTION

Using as a reference the Figures in the enclosed table, it is observed that at least one bar 1 particularly for glasses, yield elastically to allow, when worn, the divarication of said glasses beyond the usual opening axis. In more detail, each metallic bar 1 of the glasses is provided fixed on a flat side 100, and in correspondence to the anterior end 101 with an elastic hinge 2 that interacts with a part of the device, conventionally said nose, obtained on one side of the front of the glasses frame (not shown). The elastic hinge 2, (see FIG. 1) is composed of one small box 3 of somewhat limited dimensions, with a longitudinal seat 300 on its interior open by the side 30 of fixing on the corresponding bar 1. Along the perimetrical edge of the small box 3 that defines the open side 30, projections 31 of excess material are provided, for instance two on the anterior part and just one on the posterior part. Said projections 31, during a successive welding cycle for electro fusion, (see FIG. 3) to fuse with the surface 100 of the bar 1 concerned, allow the definitive and stable assurance of the small box 3.

With respect to the small box 3, frontally it provides an entrance 32 that projects longitudinally, followed by a seat defined by two symmetrical walls, perpendicular with respect to an oblique base surface 320. The aim of the entrance 32, is to allow the axial guide of a tie-rod/carriage 4, which is partly accepted inside the small box 3, and partly projecting from the latter by means of an articulation portion 40 to be hinged to the nose of the spectacles. The articulation 40 of the tie-rod/carriage 4 provides the rounded end and a central hole 400 for hinging to the nose, while on the opposite side it is possible to observe tapering, obtained by an oblique surface 41 countershaped to the shape of the entrance 32 obtained in the small box 3. The tie-rod/carriage 4, proceeding towards the posterior part takes a rectilinear shape 42 that joins the anterior part of the articulation 40 to a cross-piece 43. The cross-piece 43, obtained monolithically, provides the formation of two wings that are opposite and orthogonal to the rectilinear portion 42 ideally defining two lateral housings, or rather allowing the subdivision of the seat 300 of the small box 3 into two compartments, each of which contains one corresponding helicoidal spring 5. In more detail, the springs 5 involve both sides of the tie-rod/carriage 4, and dispose of an end 50 in abutment on the head 301 of the anterior part of the internal seat 300 of the small box 3, while with the opposite end 51 they are in abutment on the inclined surface of the corresponding wing of the cross-piece 43.

To allow, in a rest condition, the maintenance of the springs 5, slightly when working, avoiding any clearance above all relative to the tie-rod/carriage 4 immediately before the start of the oblique surface 41 of the tie-rod/carriage 4 a hook 44 is provided. The function of the hook 44, in the static condition of the device, or with the springs 5 extended, stops on the abutment seat 33 provided, by the working of the small box 3 in correspondence with the entrance 32.

Along the bottom 322 of the internal seat 300 of the small box 3 that faces the tie-rod/carriage 4, near the anterior part, a niche 321 is obtained that partially receives the compensator element 6. In this case the compensator element 6 is represented with a spherical shape, but as a rule it can take many different forms. In more detail, the compensator element 6 can be made of plastic material, preferably self-lubricating such as nylon, but can also be made of metal, and can expand during the assembly by electro fusion of the elastic hinge 2 to the side arm 1, to be melted at least partially inside the niche 321, which is countershaped to the shape of the compensator element 6, thus creating a film that is interposed between the underlying rectilinear portion 42 of the tie-rod/carriage 4 against which it pushes and the bottom 322 of the internal seat 300 of the small box 3 in correspondence to the niche 321. The position of said compensator element 6 is such as to coincide along the longitudinal median axis of the small box 3 so that with respect to this it corresponds to the underlying rectilinear portion 42 of the tie-rod/carriage 4 against which said compensator element 6 pushes lightly. In more detail, the position of the niche 321 is such that in a mounted elastic hinge condition 2 said niche does not coincide with the oblique surface 41 of the carriage/tie-rod 4, so as to allow the sliding of the latter with respect to the compensator element 6 only along the upper profile of the rectilinear portion 42 of the carriage/tie-rod 4.

I claim:

1. A hinge apparatus comprising:
   an eyeglass assembly having a side arm and a nose;
   a box affixed to said side arm, said box having an internal seat with a head at one end thereof;
   a spring housed with said box so as to have an end in abutment with said head of said internal seat of said box;
   a carriage having a first end and a second end, said spring having an opposite end in abutment with said first end of said carriage, said second end of said carriage having an articulation portion, said articulation portion hinged to said nose of said eyeglass assembly; and
   a compensator element interposed between an inner surface of said internal seat of said box and a profile of said carriage that faces said inner surface of said internal seat, said box having a niche formed therein such that said niche faces said carriage, said niche countershaped to a shaped of said compensator element, said niche at least partially receiving said compensator element therein, said niche allowing for a sliding of said carriage with respect to said compensator element only along a portion of said carriage.

2. The hinge apparatus of claim 1, said compensator element being formed of a self-lubricating polymeric material.

3. The hinge apparatus of claim 1, said compensator element coinciding with a longitudinal median axis of said box so as to correspond with an underlying rectilinear portion of said carriage such that said compensator element pushes thereagainst.

4. A hinge apparatus comprising:
   an eyeglass assembly having a side arm and a nose;
   a box affixed to said side arm said box having an internal seat with a head at one end thereof;
   a spring housed with said box so as to have an end in abutment with said head of said internal seat of said box;
   a carriage having a first end and a second end, said spring having an opposite end in abutment with said first end of said carriage, said second end of said carriage having an articulation portion, said articulation portion hinged to said nose of said eyeglass assembly; and
   a compensator element interposed between an inner surface of said internal seat of said box and a profile of said carriage that faces said inner surface of said internal seat, said carriage having an oblique surface formed therein and a rectilinear portion extending from said oblique surface, said box having a niche formed therein such that said niche faces said carriage, said niche at least partially receiving said compensator element therein, said niche positioned away from said oblique surface so as to allow for a sliding of said carriage with respect to said compensator element only along said profile of said rectilinear portion of said carriage.

* * * * *